Jan. 17, 1939. E. DAIBER 2,144,596
HYDRAULIC GEAR
Filed Sept. 18, 1935
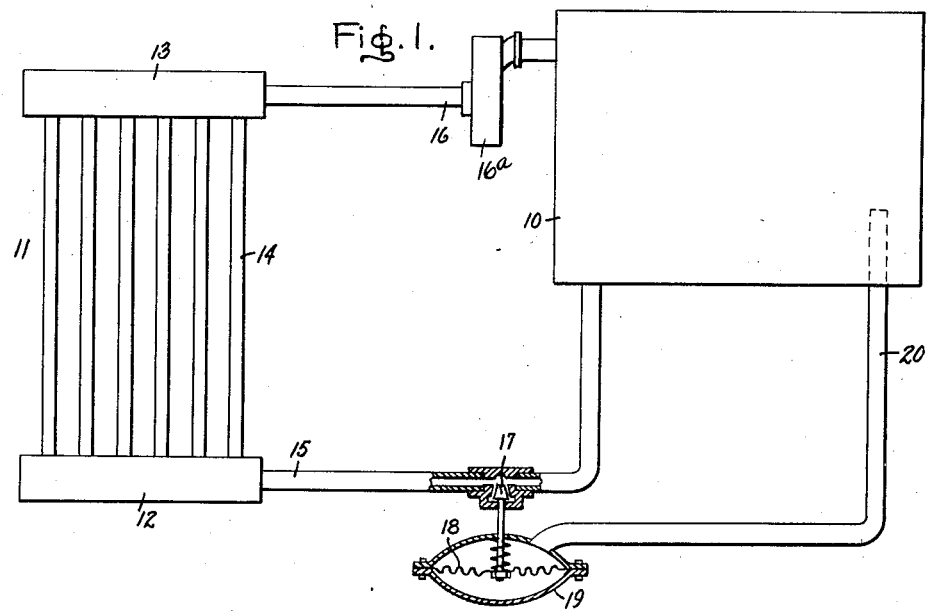
Fig. 1.
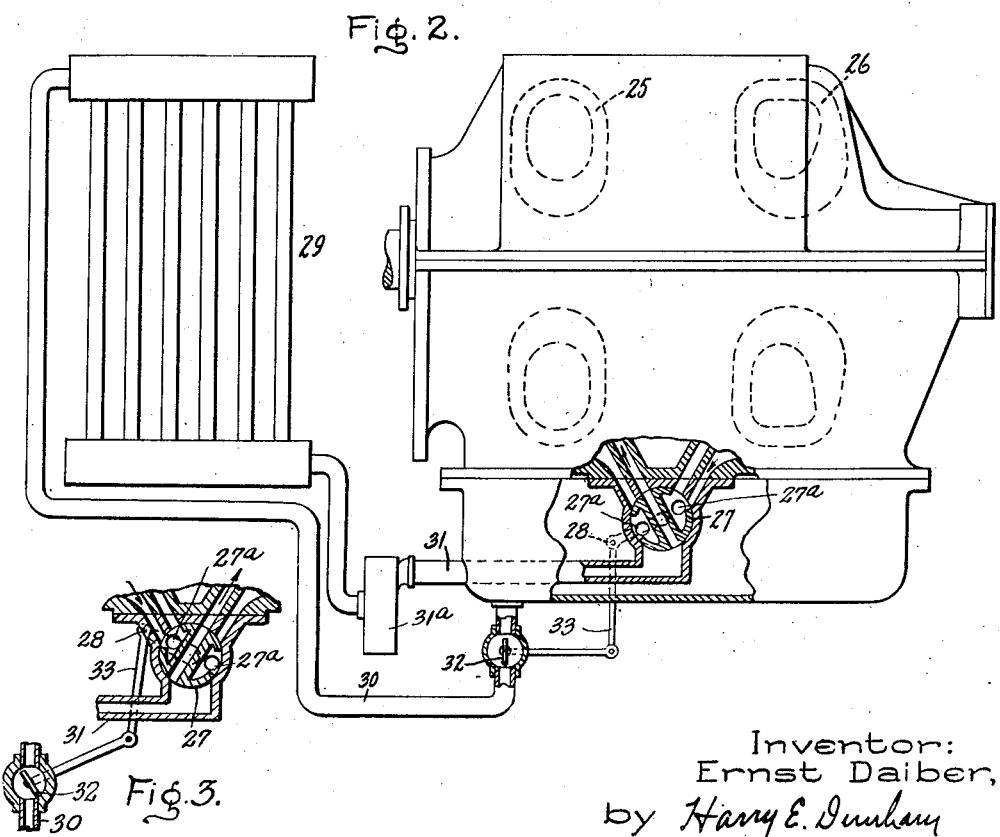
Fig. 2.
Fig. 3.
Inventor:
Ernst Daiber,
by Harry E. Dunham
His Attorney.

Patented Jan. 17, 1939

2,144,596

UNITED STATES PATENT OFFICE 2,144,596

HYDRAULIC GEAR

Ernst Daiber, Berlin-Lichterfelde, Germany, assignor to General Electric Company, a corporation of New York Application September 18, 1935, Serial No. 41,160
In Germany September 21, 1934

2 Claims. (Cl. 60—54)

The present invention relates to hydraulic drive arrangements including turbo-type converters or gears, known as Föttinger couplings, in which the torque transmission or conversion is effected through a working liquid, for instance, oil. More specifically, the invention relates to the type of hydraulic drive arrangements in which a part of the working liquid is continuously circulating through a cooler in order to dissipate the heat produced in the gear during the operation of such drive. The efficiency of these drives depends to a considerable extent upon the temperature of the working liquid, especially where oil having a high viscosity is used. Undesirable changes in viscosity and accordingly, low mean efficiency, are met with where such drive is subject to fluctuations in operating conditions and also where such drive is intermittently operated in connection with other torque transmitting means, such as couplings.

The object of my invention is to provide an improved construction and arrangement and a method of operating hydraulic drives of the type above specified, whereby higher efficiencies are attained.

This is accomplished in accordance with my invention by the provision of means for automatically controlling the cooling of the working medium in response to changes in operating conditions. In a preferred embodiment of my invention, means are provided for maintaining constant the operating temperature of the working liquid. This is especially advantageous in connection with multi-hydraulic torque converters, comprising an arrangement of several converters such as are disclosed and more fully described in U. S. Patent 1,199,359, Föttinger.

The cooling control may be accomplished in a simple manner by the provision of throttling means in the connections between the cooler and the hydraulic gear. Such throttling means may be in the form of a throttle valve automatically controlled in response to changes in temperature of the working liquid in the torque converter.

Instead of throttling valve means, I may provide other means for controlling the effective cooling area of the cooler.

As stated above, the regulation is advantageously effected in response to changes in temperature of the liquid circulating in the gear means. This may be accomplished in a simple manner by the provision of a known temperature responsive device having a bellows or diaphragm moved in response to temperature changes and connected to a throttle valve.

For a better understanding of what I consider to be novel and my invention, attention is directed to the following description and the claims appended thereto, in connection with the accompanying drawing.

In the drawing, Fig. 1 represents a diagrammatic view embodying my invention; Fig. 2 illustrates a modification according to my invention; and Fig. 3 shows a part of Fig. 2 in a different operating position.

The arrangement of Fig. 1 comprises a hydraulic torque converter 10 which may be of any design known in the art. Working liquid is circulated during operation from the torque converter 10 through a cooler 11, in the present instance shown as a heat exchanger cooled by air. The cooler 11 includes a lower header 12, an upper header 13, and a plurality of cooling tubes 14 connected between the headers. Liquid to be cooled is conducted from the converter 10 through a cooling circuit. The liquid to be cooled flows from the converter 10 through a pipe 15 into the lower header 12 and returned from the upper header 13 through a pipe 16, including a pump 16a, to the converter 10. The pipe 15 includes a throttle valve means 17 which, in accordance with my invention, is controlled in response to changes in temperature of the operating liquid in the converter 10. To this end, the valve stem is secured to a diaphragm 18 contained in a casing 19 and dividing the casing into a lower half and an upper half. The upper half is connected to one end of a tube 20 which has another end sealed and subject to the temperature of the working liquid in the converter 10. The tube 20 is filled with a fluid which expands in response to temperature increase in the converter 10 and contracts in response to temperature drop.

During operation, an increase in temperature of the working liquid in the converter 10 causes expansion of the fluid in the tube 20 whereby the diaphragm 18 is moved downward, causing opening movement of the valve 17, and thereby permitting an increased circulation of working liquid through the cooler 11.

Fig. 2 shows a multihydraulic gear means comprising a turbo-type gear 25 and another gear or coupling 26. Both of these gears are operated by liquid, but the first, that is, the hydraulic gear 25, effects more heating of the working liquid than does the coupling or gear 26. The two gears 25 and 26 are alternately put into operation by means including a multi-way valve member 27 having a handle 28. In the position shown, liquid is supplied to the gear 25 which is operating, and the gear 26 is out of operation, the operating liquid of gear 26 being discharged through an opening 27a in the end wall of the valve member 27. The arrangement also includes a cooler 29 disposed external of the gear casing and conduits 30 and 31 for circulating operating liquid from the gears through the cooler 29. A pump 31a is connected into the conduit 31 to effect circulation of operating liquid between the gear 25 and the cooler 29. The conduit 30 includes a valve 32 which is positioned in accordance with my invention in response to changes in the operating position of the lever 28. Turning of the lever 28 in clockwise direction to put out of operation the gear 25 and to operate the gear 26 causes closing movement of the valve 32 (Fig. 3), which latter is connected to the lever 28 by a link 33. Closing movement of the valve 32 restricts the circulation of oil or like working liquid through the cooler 29 whereby substantially the same temperature is maintained during the operation of the gear 26 as existed before during the operation of the gear 25. During operation, with the valve 27 in the position shown in Fig. 3, operating fluid is conducted through the inlet channel for the gear 26 and discharged therefrom in known manner in the form of leakage along the gear shaft and like points.

Having described the method of operation of my invention, together with the apparatus which I now consider to represent the best embodiments thereof, I desire to have it understood that the apparatus shown is only illustrative and that the invention may be carried out by other means.

What I claim as new and desire to secure by Letters Patent of the United States is:

1. A hydraulic drive arrangement including the combination of a hydraulic gear for effecting torque transmission, other means for effecting torque transmission, means for circulating working liquid through the hydraulic gear and the other torque transmitting means, means for alternatively effecting operation of the hydraulic gear and for rendering inoperative the other torque transmitting means and vice versa, and means for controlling the circulation of working liquid in response to operation of the last named means.

2. The combination of two torque transmitting means including working liquid, a cooler for cooling the working liquid, means for alternatively rendering one of the torque transmitting means inoperative, and means for simultaneously controlling the cooling effect of said cooler in response to operation of the last named means.

ERNST DAIBER.